(12) United States Patent
Bradley et al.

(10) Patent No.: US 8,118,005 B2
(45) Date of Patent: Feb. 21, 2012

(54) AUXILIARY POWER UNITS FOR VEHICLES

(75) Inventors: James C. Bradley, New Haven, IN (US); Anthony Joseph Cook, Fort Wayne, IN (US); Rodney J. Klinger, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 866 days.

(21) Appl. No.: 12/188,761

(22) Filed: Aug. 8, 2008

(65) Prior Publication Data

US 2010/0032222 A1 Feb. 11, 2010

(51) Int. Cl.
*B60K 6/20* (2007.10)
*F02N 11/00* (2006.01)

(52) U.S. Cl. ................... 123/179.19; 180/69.6

(58) Field of Classification Search ............. 123/179.19; 74/7 C; 180/69.6
See application file for complete search history.

(56) References Cited

U.S. PATENT DOCUMENTS

| | | | |
|---|---|---|---|
| 1,009,276 A * | 11/1911 | Boyle | 123/179.19 |
| 1,108,720 A * | 8/1914 | Desmond | 123/179.19 |
| 1,440,815 A * | 1/1923 | Bonta | 123/179.19 |
| 2,943,617 A | 7/1960 | Zuhn | |
| 3,493,066 A * | 2/1970 | Dooley | 180/165 |
| 3,991,734 A | 11/1976 | Martin | |
| 4,169,447 A | 10/1979 | Furzer | |
| 4,448,157 A | 5/1984 | Eckstein et al. | |
| 4,611,466 A | 9/1986 | Keedy | |
| 4,682,649 A | 7/1987 | Greer | |
| 4,756,359 A | 7/1988 | Greer | |
| 4,762,170 A | 8/1988 | Nijjar et al. | |
| 4,825,663 A | 5/1989 | Nijjar et al. | |
| 5,333,678 A | 8/1994 | Mellum et al. | |
| 5,528,901 A | 6/1996 | Willis | |
| 7,049,707 B2 | 5/2006 | Wurtele | |
| 2004/0035112 A1 | 2/2004 | Bhabra | |
| 2004/0104578 A1 | 6/2004 | Wurtele | |

FOREIGN PATENT DOCUMENTS

SE 442322 B 12/1985

* cited by examiner

*Primary Examiner* — Stephen K Cronin
*Assistant Examiner* — Arnold Castro
(74) *Attorney, Agent, or Firm* — Jeffrey P. Calfa; Mark C. Bach

(57) ABSTRACT

Cooperative operation of an auxiliary power unit having a mechanical power output shaft with a transmission coupled power takeoff operation system of a vehicle is provided by allowing the vehicle's main engine to be cranked by the auxiliary power unit through the power takeoff operation system.

4 Claims, 2 Drawing Sheets

AUXILIARY POWER UNITS FOR VEHICLES

BACKGROUND OF THE INVENTION

1. Technical Field

The technical field relates to auxiliary power units for vehicles and more particularly to auxiliary power units providing start cranking for vehicle primary engines.

2. Description of the Problem

As part of tighter motor vehicle emission standards, commercial operators of trucks will be required to avoid long term idling of diesel engines. Extended idling has been a common practice among truck drivers who park their rigs for mandatory break periods and desire to have power for heating, cooling and entertainment while on break. To meet the demand for power, heating and cooling during break periods, auxiliary power units (APU's) have long been used on some trucks for the fuel savings they produce against running larger displacement primary engines. Interest in APU's for trucks has greatly intensified in recent years due to motor vehicle emission standards and higher fuel prices. These factors are overcoming the disadvantages long associated with APU's such as bulkiness and added weight.

The revived interest in APU's has also revived the dilemma of how best to apply such systems. It is more or less a given that they should be used to supply the vehicle with an auxiliary source of electrical power. The art though reflects a debate about the degree to which the APU should be interconnected with a vehicle's main engine. There are a number of trade-offs to consider, for example, an APU based on an air-cooled internal combustion engine saves on vehicle weight, but if the auxiliary engine is air cooled, heated coolant is not available to warm the vehicle's coolant for circulation through a cold compression ignition engine to ease starting of that engine.

The degree to which an auxiliary engine is interconnected with the vehicle's primary engine reflects an underlying debate about the possible functions that an auxiliary engine might fulfill beyond providing electrical power and heat. Starter engines have long been employed with heavy duty compression ignition engines due to the difficulties associated with starting such engines in cold weather, although in the early art such starter engines were not described as fulfilling the functions commonly thought of for contemporary auxiliary power units. A starter engine requires coupling to the main engine to provide cranking of the engine. Typically some sort of mechanical or hydraulic transmission has been provided. U.S. Pat. No. 2,943,617 exemplifies a hydraulic drive for a starter motor. U.S. Pat. No. 3,991,734 illustrated mechanical coupling of an "auxiliary engine" to supplement an electrical starter motor or air starter. U.S. Pat. No. 5,528,901 proposes using an auxiliary engine to support pressurizing air for an air starter, allowing the conventional heavy duty battery pack and electric starter motor to be eliminated.

SUMMARY

Auxiliary power units for vehicles may be provided which serve dual functions by evaluation of the functions of the vehicle. Economical, simple incorporation of new functionality is achieved by incorporating cooperative operation of vehicle power takeoff operation facilities with the auxiliary power unit. The disclosure teaches an auxiliary power unit with a shaft output which is selectively coupled to a primary compression ignition engine for starting the primary engine. The conventional electric starter is displaced.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawing, wherein:

DETAILED DESCRIPTION OF THE ILLUSTRATIVE EMBODIMENT

Figure 1:
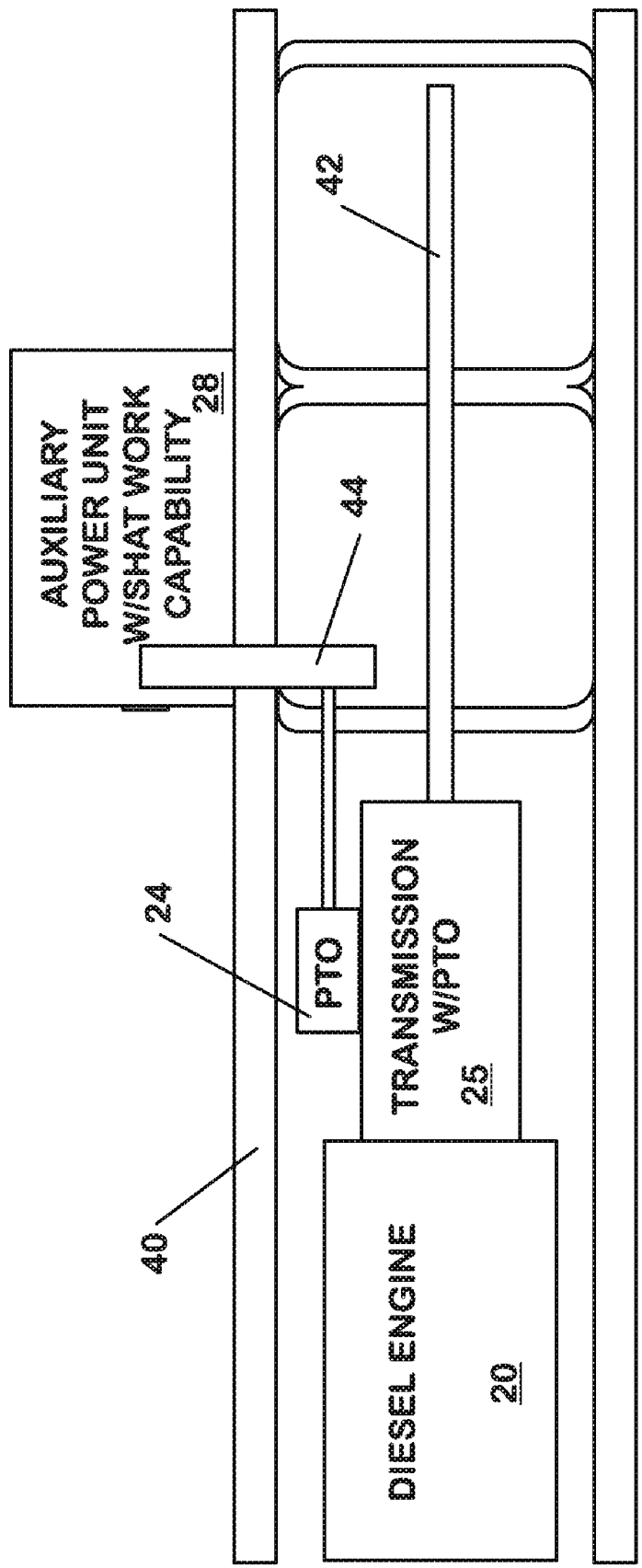
FIG. 1 is a schematic of a vehicle chassis.

Referring to the figures, a motor vehicle chassis 40 supports power generation sources including a primary diesel engine 20 and an auxiliary power unit 28 with a power output shaft 47. A power conversion and distribution system includes an electrical generator 30, a transmission 25 and a power takeoff operation system 24. Auxiliary power unit 28 supports, at a minimum, vehicle electrical loads 32 by providing power to an electrical generator 30. It also serves as a starter motor for a vehicle's primary diesel engine 20. A clutch 35 provides for connection of the transmission 25 to a flywheel (not shown) of the engine 20. The transmission 25 is coupled to drive a drive shaft 42 and a power takeoff operation element 24, such as a hydraulic pump. Power takeoff operation element 24 is mechanically connected to the auxiliary power unit 28 by a coupler 44. Power takeoff systems are found on many heavy duty vehicles as a way of utilizing the primary motive engine of such vehicles for other operations. For example, tow trucks utilize power takeoff operation systems to operate winches.

Coupler 44 allows APU 28 shaft output to be fed backwards through a clutch transmission 25 power takeoff operation element (PTO) 24. The PTO 24 is attached to a clutched transmission and drives the transmission gears to turn the transmission input shaft which has a clutch 35 connection to an engine 20 flywheel.

Figure 2:
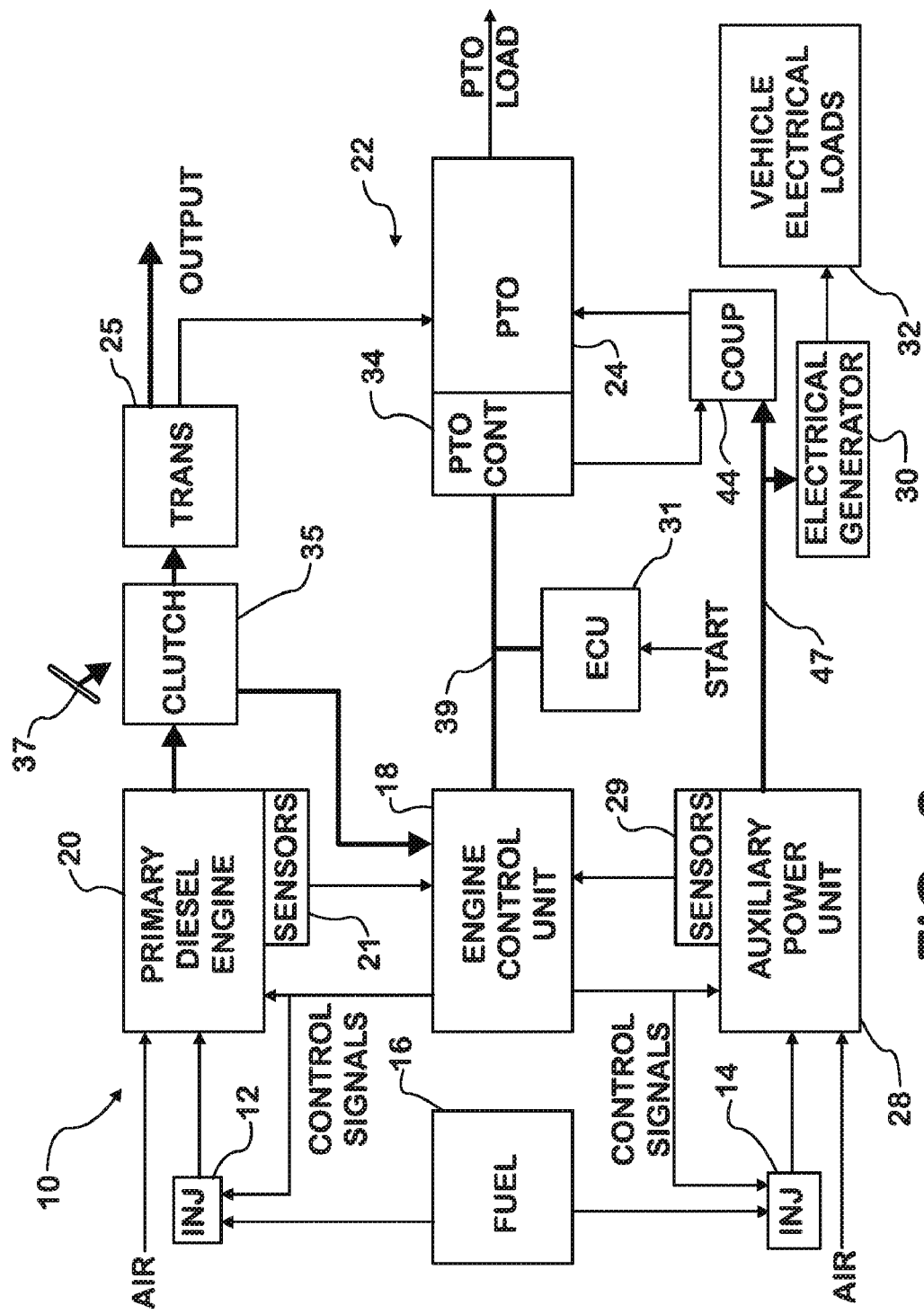
FIG. 2 is a high level control schematic illustrating implementation of the illustrative embodiment.

Referring more particularly to FIG. 2, several vehicle control elements are involved in implementing application of the APU 28 to starting the primary diesel engine 20. The essential start sequence for the primary diesel engine 20 provides that APU 28 is already running and that the clutch pedal 37 is depressed so that the clutch 35 connects the PTO to the engine flywheel but does not connect the engine 20 (or PTO 24) to the vehicle's drive wheels (not shown). A start signal is then applied to the vehicle electronic control unit 31 which indicates to the engine control unit 18 to provide fuel to the primary diesel engine 20 and possibly to increase fuel flow to the auxiliary power unit 28.

The power sources 22 for a vehicle draw air from the environment, which is drawn or engine 20, an auxiliary power unit (APU) 28, or both. APU 28 is preferably, but not necessarily, a one or two cylinder diesel engine of small displacement which can operate on the same diesel fuel used for the primary diesel engine 20. Where APU 28 is a diesel, fuel for its operation is drawn from a fuel reservoir 16 which also supplied primary diesel 20. Fuel is injected by fuel injectors 12 and 14 into the cylinders of engine 20 and APU 28 for operation of the engines. The air/fuel ratio is controlled by controlling the amount of fuel injected into the cylinders. This control is implemented through control signals from an engine control unit 18. APU 28 can be operated independently to turn an electrical generator 30 to power vehicle electrical loads 32. Conventional sensor packages 21, 29 provide feedback to the engine control unit 18 regarding power source 22 operation.

Engine control unit 18 also receives an input indicating clutch 35 position. A PTO controller 34, the electronic control unit 31 and the engine control unit 18 communicate with one another over a data network 39, which is preferably implemented as an SAE J1939 protocol compliant, controller area network (CAN) bus. PTO controller 34 status and the position of clutch 35 are used to implement start interlocks built into the system and that automatically shut off PTO 24 as soon as diesel engine 20 is running. If it is desired to power PTO 24 from the primary engine 20, it is necessary that the operator follow whatever protocol is built into the system, however the PTO 24 defaults to an OFF status upon start of the primary engine 20.

The teachings herein show how an auxiliary power unit can be conveniently adapted to serve as a starter motor on a vehicle equipped for power take off operation and utilizing a clutched transmission. This greatly simplifies adapting an APU to serve as a starter motor.

The teachings are not limited in scope to the illustrative embodiment, but are susceptible to various changes and modifications without departing from their spirit and scope.

What is claimed is:

1. A power system for a motor vehicle comprising:
   an internal combustion engine;
   an auxiliary power unit;
   a transmission for distributing power from the internal combustion engine;
   a power takeoff operation unit coupled with the transmission for diversion of power to a power takeoff system;
   a selective coupling element from an auxiliary engine to the power takeoff operation system;
   a clutch for mechanically coupling work from the internal combustion engine to the transmission, the clutch having a position allowing reverse transmission of mechanical energy from the auxiliary engine, the selective coupling element and the power take operation system for cranking the internal combustion engine;
   a starter signal source; and
   a controller system responsive to the starter signal for determining clutch position and whether the auxiliary engine is on and the internal combustion engine is off for coupling mechanical output from the auxiliary engine to the power takeoff operation unit.

2. An auxiliary power unit for a motor vehicle powered by a compression ignition engine, comprising:
   a mechanical power output from the auxiliary power unit;
   a transmission for distributing power from the compression ignition engine;
   a clutch for coupling mechanical output from the compression ignition engine to the transmission;
   a power takeoff operation system coupled with the transmission;
   a mechanical energization coupling element between the power takeoff operation system and the mechanical power output of auxiliary power unit;
   a control system responsive to operation of the clutch to transmit power from the power takeoff operation system to a flywheel of the compression ignition engine, the compression ignition engine being off, the auxiliary power unit being on and a start signal being receiving for applying power to the compression ignition engine from the auxiliary power unit through the power takeoff unit for cranking the compression ignition engine; and
   the control system being further responsive to starting of the compression ignition engine for disengaging the power takeoff operation system.

3. An auxiliary power unit as claimed in claim 2, further comprising:
   an electrical generator coupled to receive energization from the mechanical power output of the auxiliary power unit.

4. An auxiliary power unit as claimed in claim 2, further comprising:
   the auxiliary power unit including a diesel engine.

* * * * *